Figure 1:
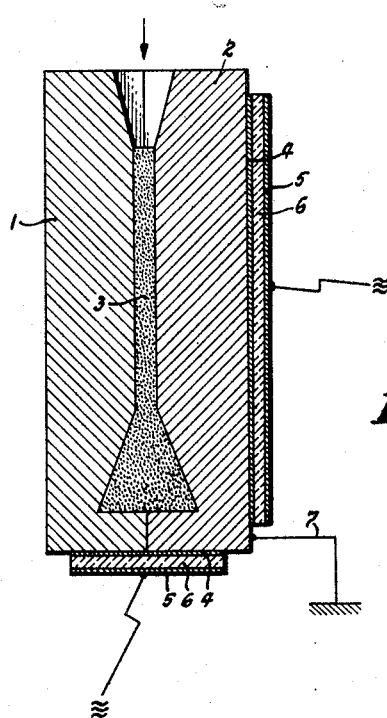

July 21, 1953  E. SÖRENSEN ET AL  2,645,836

MOLDING METHOD

Filed Dec. 29, 1949

INVENTORS
Emil Sörensen and
BY Herbert Scharf
Marechal & Biebel
ATTORNEYS

UNITED STATES PATENT OFFICE 2,645,836

MOLDING METHOD

Emil Sörensen and Herbert Scharf, Augsburg, Germany, assignors to Maschinenfabrik Augsburg-Nurnberg A. G., Augsburg, Germany, a corporation of the German Republic Application December 29, 1949, Serial No. 135,579
In Germany July 1, 1949

6 Claims. (Cl. 25—156)

This invention relates to a method for the manufacture of solid preliminary mouldings from powderous initial materials, and more particularly, for the manufacture of blades of turbine engines or other machine parts from ceramic materials.

It is known in the preparation of mouldings, e. g., for the manufacture of refractory stones or the like, to reduce the crumbling or granular raw mass coming from the grinding and mixing plant, to the desired dimensions by shaking in a mould. Also, it has been suggested already in addition to the coarse shaking of the mould, e. g., on a shaking table, to act upon the surface of the raw mass filled into the mould by means of a second source of vibrations with rapid oscillations of a small amplitude, with the aid of a stamp. It was found out that the compression of the raw material in the mould owing to the very intensive effect of the rapid oscillations of a small amplitude extending very deeply at least equals the compaction by external pressure. However, with all these known methods of moulding artificial stones always mixtures of the raw mass with some binder, at least with water, have been used. By shaking the raw mass in the mould the same was converted into a dough-like or even liquid state permitting a good filling of the mould. However, these known methods cannot be used successfully for the manufacture of objects of smaller dimensions and more intricate shape in which the raw mass is to be introduced into the mould in the form of dry powder.

According to the present invention such constructional parts or elements are moulded in such a way that supersonic waves are made to act upon the dry raw mass, being, e. g., in the form of powder, which is filled into the mould. In this case the rearrangement of the single particles of the raw mass and their compaction is so intensive without the use of any mechanical compression that a solid body will result which can easily be removed from the mould, worked and burnt. According to a special feature of the invention, the supersonic waves are selectively directed, whereby a preferred direction of maximum strength adapted to the respective moulding can be attained. This results from the fact that it is a special property of supersonic waves to exert effect on the individual particles of the raw mass, and this straightening takes place in such manner that each individual particle is placed in the direction of the effecting oscillations in the least inertia momentum. Thus the invention makes it possible to obtain increased solidity in the direction of compression, and this increased solidity direction can if desired be so chosen that it coincides with the principal direction of stress of the finished machine part. Further far-reaching possibilities are offered by the use of a plurality of sources of sound of a predetermined directional effect.

My novel method is of a particular importance for the manufacture of raw mouldings from ceramic materials which are subject to particular requirements as to their strength, such as, e. g., blades for turbine engines or pumps or other ceramic machine parts which in addition to high thermal stresses are also exposed to intensive mechanical strains. However, my novel method is not restricted to the manufacture of such elements, but it may also be used for manufacturing other mouldings, since it is very economical, owing to its simple operation. It will be understood that my novel method can also be used in case of a granular or powderous raw mass in connection with a binder.

Figure 2:
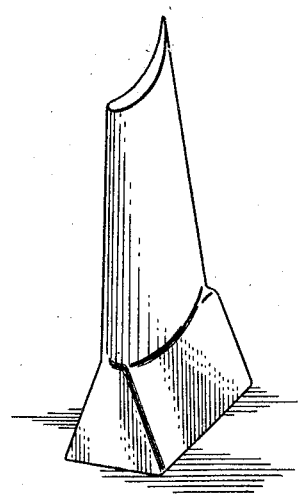

One embodiment of an arrangement for carrying out the method according to the invention is shown by way of example in Fig. 1 of the accompanying drawing, in a sectional view, and a turbine blade produced by my novel method is shown in Fig. 2 of said drawing.

The metal mould for accommodating the ceramic powder consists of the parts 1 and 2. The ceramic powder is filled into the hollow space 3. Provided at the outer walls of the mould are two oscillators exemplified by piezo-electric quartz systems comprising two metal plates 4 and 5 sandwiching a quartz plate 6. The outer plate 5 is connected to a source of high frequency energy. The current is led off from the mould through the wire 7. Each oscillator is thus effectively acoustically coupled to the mould so that the transmission of the supersonic wave oscillations to the raw mass to be compressed does not take place mechanically but through the intermediary of a transmitting medium, which in the illustrated construction is shown as the mould parts 1 and 2. It will be understood that it would also be possible to arrange the oscillators in another manner with respect to the ceramic body in order to achieve special vibration effects. By designing the outer walls of the metal mould in a suitable manner it is possible to arrange oscillators in any direction in relation to the ceramic body.

My novel method is of special importance in connection with ceramic powders of a high strength, such as silicon compounds.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a method for compression molding of ceramic articles from a mass of pulverous ceramic material, the steps of introducing into a mold ceramic material in a dry powdered state and substantially free of binders, compressing said material in said mold by subjecting it to high frequency supersonic vibrations of small amplitude, continuing said vibrations in the absence of external mechanical pressure application until said material is compacted into a self-sustaining article, removing said article from said mold, and firing said molded article in the same form as removed.

2. In a method for the manufacture of molded ceramic articles by compressing a mass of pulverous ceramic material into a solid article in a mold, the steps of introducing dry pulverous ceramic material into a mold, compressing said material into the shape of said mold by subjecting said material in said mold to supersonic vibrations, continuing said vibrations in the absence of external pressure application until said material is compacted into a self-sustaining article, removing said article from said mold, and firing said molded article in the same form as removed.

3. The method according to claim 2, in which said supersonic vibrations are directed through said material in a predetermined direction coordinated with the shape of said article producing maximum strength orientation of said pulverous material.

4. The method according to claim 2 in which said supersonic vibrations are directed through said pulverous material from a plurality of sources and in a plurality of directions for producing maximum strength orientation of particles in said pulverous material according to the shape and function of said article.

5. The method according to claim 2 in which said supersonic vibrations are produced in a plurality of different frequencies effecting maximum strength orientation of components in said pulverous material responsive to said frequencies.

6. A molded ceramic article of intricate shape comprising a fired mass of ceramic material substantially free of binder material and of a nonuniform internal stresses, said product being further characterized as having been produced according to the method of claim 2.

EMIL SÖRENSEN.
HERBERT SCHARF.

References Cited in the file of this patent

UNITED STATES PATENTS

| Number | Name | Date |
|---|---|---|
| 1,374,493 | Dimitri et al. | Apr. 12, 1921 |
| 1,680,832 | Wilder | Aug. 14, 1928 |
| 1,768,546 | Curtis | July 1, 1930 |
| 1,884,528 | Benner et al. | Oct. 25, 1932 |
| 2,008,117 | Tone | July 16, 1935 |
| 2,106,329 | Scott | Jan. 25, 1938 |
| 2,111,418 | Buxhaum | Mar. 15, 1938 |
| 2,122,960 | Schwartzwalder | July 5, 1938 |
| 2,246,165 | Dawihl et al. | June 17, 1941 |
| 2,256,033 | McLachlan | Sept. 16, 1941 |
| 2,306,107 | Henderson | Dec. 22, 1942 |